United States Patent
Yamada

(10) Patent No.: US 11,115,582 B2
(45) Date of Patent: Sep. 7, 2021

(54) IMAGING CONTROL APPARATUS, IMAGING APPARATUS, AND RECORDING MEDIUM

(71) Applicant: JVCKENWOOD Corporation, Yokohama (JP)

(72) Inventor: Kunio Yamada, Yokohama (JP)

(73) Assignee: JVCKENWOOD CORPORATION, Kanagawa (JP)

( * ) Notice: Subject to any disclaimer, the term of this patent is extended or adjusted under 35 U.S.C. 154(b) by 33 days.

(21) Appl. No.: 16/698,541

(22) Filed: Nov. 27, 2019

(65) Prior Publication Data
US 2020/0169668 A1     May 28, 2020

(30) Foreign Application Priority Data

Nov. 28, 2018  (JP) .............................. JP2018-222240
Dec. 11, 2018  (JP) .............................. JP2018-231602

(51) Int. Cl.
H04N 5/232        (2006.01)

(52) U.S. Cl.
CPC . H04N 5/232125 (2018.08); H04N 5/232123 (2018.08)

(58) Field of Classification Search
CPC ......... H04N 5/232125; H04N 5/23212; H04N 13/0271; G06T 7/571; G06T 2207/10016; G06T 7/0069; G06T 5/20; G02B 7/36; G02B 21/241; G02B 21/361
See application file for complete search history.

(56) References Cited

U.S. PATENT DOCUMENTS

| | | | |
|---|---|---|---|
| 2007/0172141 A1* | 7/2007 | Bando | G06T 5/003 382/261 |
| 2009/0195666 A1* | 8/2009 | Chen | G06T 5/50 348/218.1 |
| 2011/0142287 A1* | 6/2011 | Wong | G06T 7/571 382/106 |

(Continued)

FOREIGN PATENT DOCUMENTS

| | | |
|---|---|---|
| JP | 2016-111609 A | 6/2016 |
| WO | 2011/158515 A1 | 12/2011 |

OTHER PUBLICATIONS

Zhuo, S. et al. "Defocus map estimation from a single image", Pattern Recognition, Sep. 2011, pp. 1852-1858; vol. 44, Issue 9.

(Continued)

*Primary Examiner* — Abdelaaziz Tissire
(74) *Attorney, Agent, or Firm* — Procopio, Cory, Hargreaves & Savitch LLP

(57) ABSTRACT

The signal calculation unit calculates first, second, and third signal about an amount of blur or high frequency signal, which are related to an edge, based on a first luminance signal, a second luminance signal, and a third luminance signal, respectively. The data expansion unit expands the signals about an amount of blur or high frequency signal respectively to first, second, and third expanded signal data. A control method determination unit sets a back focus area based on a magnitude relation between the first expanded signal data and the second expanded signal data and set a front focus area based on magnitude relation between the first expanded signal data and the third expanded signal data to thereby control focus.

13 Claims, 20 Drawing Sheets

(56) References Cited

U.S. PATENT DOCUMENTS

| | | | | |
|---|---|---|---|---|
| 2012/0148109 A1* | 6/2012 | Kawamura | ............. | G02B 7/38 |
| | | | | 382/106 |
| 2015/0043783 A1* | 2/2015 | Ishihara | ................. | G06T 7/571 |
| | | | | 382/106 |
| 2016/0165126 A1* | 6/2016 | Mishima | ................. | G06T 7/571 |
| | | | | 382/255 |
| 2019/0014262 A1* | 1/2019 | Yamaguchi | ............... | G06T 7/55 |

OTHER PUBLICATIONS

Fisher, R. et al. "Gaussian Smoothing" [online], 2003, 8 pages (https://homepages.inf.ed.ac.uk/rbf/HIPR2/gsmooth.htm).
Fisher, R. et al. "Sobel Edge Detector", [online], 2003, 7 pages (https://homepages.inf.ed.ac.uk/rbf/HIPR2/sobel.htm).

* cited by examiner

Fig. 8

$$\frac{1}{273}$$

| 1 | 4 | 7 | 4 | 1 |
|---|---|---|---|---|
| 4 | 16 | 26 | 16 | 4 |
| 7 | 26 | 41 | 26 | 7 |
| 4 | 16 | 26 | 16 | 4 |
| 1 | 4 | 7 | 4 | 1 |

Fig. 9

| -1 | 0 | +1 |
|---|---|---|
| -2 | 0 | +2 |
| -1 | 0 | +1 |

Gx

| +1 | +2 | +1 |
|---|---|---|
| 0 | 0 | 0 |
| -1 | -2 | -1 |

$\frac{1}{256}$
| 1 | 4 | 6 | 4 | 1 |
|---|---|---|---|---|
| 4 | 16 | 24 | 16 | 4 |
| 6 | 24 | 36 | 24 | 6 |
| 4 | 16 | 24 | 16 | 4 |
| 1 | 4 | 6 | 4 | 1 |

Fig. 21

$\frac{1}{256}$
| -1 | -4 | -6 | -4 | -1 |
|----|----|----|----|----|
| -4 | -16 | -24 | -16 | -4 |
| -6 | -24 | 220 | -24 | -6 |
| -4 | -16 | -24 | -16 | -4 |
| -1 | -4 | -6 | -4 | -1 |

IMAGING CONTROL APPARATUS, IMAGING APPARATUS, AND RECORDING MEDIUM

CROSS REFERENCE TO RELATED APPLICATION

This application is based upon and claims the benefit of priorities from Japanese patent application No. 2018-222240, filed on Nov. 28, 2018, and Japanese patent application No. 2018-231602, filed on Dec. 11, 2018, the disclosure of which is incorporated herein in its entirety by reference.

BACKGROUND

The present disclosure relates to an imaging control apparatus, an imaging apparatus, and an imaging control program. In particular, the present disclosure relates to an imaging control apparatus, an imaging apparatus, and an imaging control program using autofocus (AF) technology employed in still and moving image cameras.

A contrast method is widely used as autofocus (hereinafter may be referred to as "AF") for an imaging apparatus such as a camera unit mounted on a video camera or a smartphone, because it is advantageous for enhancing accuracy and miniaturization. In the contrast method, focus control is performed in such a way that a contrast signal reaches its peak. However, the contrast method has a problem that a focusing speed is insufficient, because a search range often becomes relatively large, and it is vulnerable to a change (such as movement or lighting) of an object.

In order to solve this problem, DFD (Depth From Defocus) AF has recently been used. The DFD method can perform high-speed and highly accurate AF without using a special optical system or a dedicated sensor. International Patent Publication No. WO 2011/158515 discloses processing of 1) acquiring images at two depths, 2) creating an all-in-focus image, 3) applying blur parameters to the all-in-focus image at the two depths and creating (two sets of) blur images that are focused on a plurality of depths, 4) evaluating similarity between two acquired depth images and two sets of blurred maps to create a distance map, and 5) combining the two distance maps. Japanese Unexamined Patent Application Publication No. 2016-111609 discloses creating an all-in-focus image, and then creating blur maps at two depths created based on the all-in-focus image, and comparing distances to the focus based on the sizes of the blur maps to create a distance map.

SUMMARY

In International Patent Publication No. WO 2011/158515 and Japanese Unexamined Patent Application Publication No. 2016-111609, it is necessary to create an all-in-focus image. A process of creating an all-in-focus image relatively takes time, which leads to a problem that a speed of AF is influenced. A blur radius 0 is sometimes difficult to be determined in the vicinity of a focused point. Japanese Unexamined Patent Application Publication No. 2016-111609 discloses, in the third embodiment, a solution to this problem (for example, see paragraphs 0046 to 0047 of Japanese Unexamined Patent Application Publication No. 2016-111609). However, the cost for calculation in this solution is not small.

A first example aspect of an embodiment is an imaging control apparatus including:
- a conversion unit configured to convert a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;
- an signal calculation unit configured to calculate a first signal, a second signal and a third signal about an amount of blur or high frequency signal, which are related to an edge, based on the first luminance signal, the second luminance signal, and the third luminance signal, respectively;
- an data expansion unit configured to expand the calculated first signal, the calculated second signal, and the calculated third signal respectively to first expanded signal data, second expanded signal data, and third expanded signal data, which are related to a peripheral edge pixel;
- a comparison unit configured to compare the first expanded signal data, the second expanded signal data, and the third expanded signal data with each other; and
- a control method determination unit configured to set a back focus area based on a magnitude relation between the first expanded signal data and the second expanded signal data and set a front focus area based on magnitude relation between the first expanded signal data and the third expanded signal data to thereby control focus.

A second example aspect of the embodiment is an imaging apparatus including:
- an imaging unit; and
- the above imaging control apparatus.

A third example aspect of the embodiment is a non-transitory computer readable medium storing an imaging control program that causes a computer to execute:
- processing of converting a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;
- processing of calculating a first signal, a second signal and a third signal about an amount of blur or high frequency signal, which are related to an edge, based on the first luminance signal, the second luminance signal, and the third luminance signal, respectively;
- processing of expanding the calculated first signal, the calculated second signal, and the calculated third signal respectively to first expanded signal data, second expanded signal data, and third expanded signal data, which are related to a peripheral edge pixel;
- processing of comparing the first expanded signal data, the second expanded signal data, and the third expanded signal data with each other; and
- processing of setting a back focus area based on a magnitude relation between the first expanded signal data and the second expanded signal data and setting a front focus area based on a magnitude relation between the first expanded signal data and the third expanded signal data to thereby control focus.

A fourth example aspect of the embodiment is a imaging control method including:
- converting a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;

calculating a first signal, a second signal and a third signal about an amount of blur or high frequency signal, which are related to an edge, based on the first luminance signal, the second luminance signal, and the third luminance signal, respectively;

expanding the calculated first signal, the calculated second signal, and the calculated third signal respectively to first expanded signal data, second expanded signal data, and third expanded signal data, which are related to a peripheral edge pixel;

comparing the first expanded signal data, the second expanded signal data, and the third expanded signal data with each other; and setting a back focus area based on a magnitude relation between the first expanded signal data and the second expanded signal data and setting a front focus area based on a magnitude relation between the first expanded signal data and the third expanded signal data to thereby control focus.

BRIEF DESCRIPTION OF THE DRAWINGS

The above and other aspects, advantages and features will be more apparent from the following description of certain embodiments taken in conjunction with the accompanying drawings, in which:

FIG. 8 is a diagram showing an example of an operator used for a Gaussian filter;

FIG. 9 is a diagram showing an example of an operator used for Sobel convolution;

FIG. 20 is a diagram showing an example of an operator used for a Gaussian filter;

FIG. 21 is a diagram showing an example of an operator used for a Laplacian filter;

DETAILED DESCRIPTION

Hereinafter, specific embodiments to which the present disclosure is applied will be described in detail with reference to the drawings. However, the present disclosure is not limited by the following embodiments. Further, the following descriptions and the drawings are simplified as appropriate in order to clarify the descriptions.

First Embodiment

Figure 1:
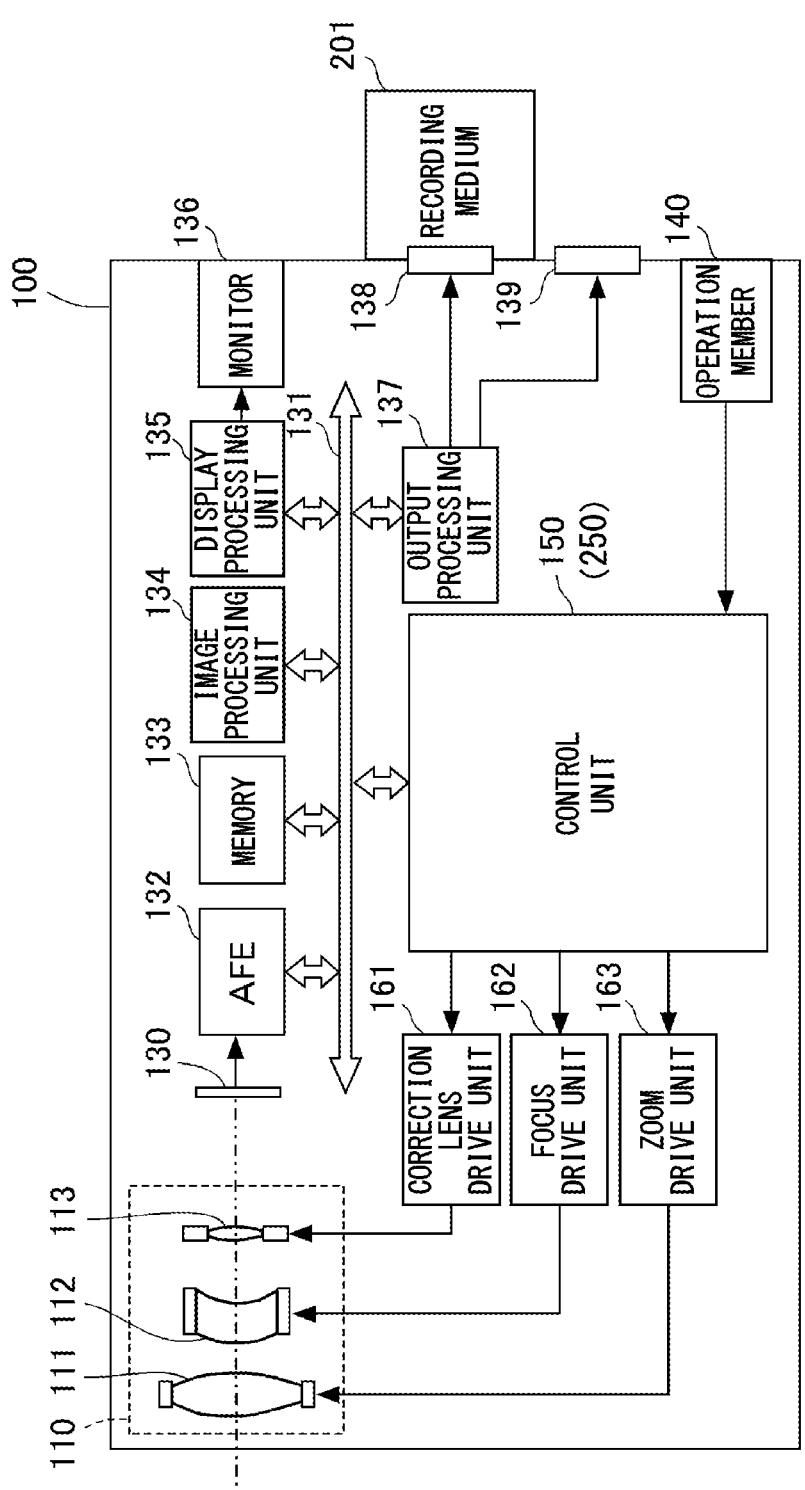
FIG. 1 is a block diagram showing a configuration of an imaging apparatus according to a first embodiment.

FIG. 1 is a block diagram showing a configuration of an imaging apparatus 100 according to this embodiment. The imaging apparatus 100 is, for example, a camcorder. The imaging apparatus 100 according to this embodiment includes an imaging control apparatus which includes a control unit 150 (250) that moves a focus lens 112 in an optical axis direction to perform autofocus. The imaging apparatus may have a configuration in which an imaging control unit for performing autofocus is attached to a main body unit which includes an imaging unit. Although the following descriptions are made assuming that a moving image is captured, a main function of the imaging apparatus may be to capture still images.

An optical system 110 includes a zoom lens 111, the focus lens 112, and a correction lens 113. The zoom lens 111 moves in the optical axis direction so as to change a focal length of the optical system 110. The focus lens 112 moves in the optical axis direction so as to focus on a subject at a specific distance. The correction lens 113 moves in a planar direction orthogonal to the optical axis so as to reduce blurring of a subject image formed on an imaging element 130.

The subject image passes through the optical system 110 and forms an image on an imaging surface of the imaging element 130. Although the zoom lens 111, the focus lens 112, and the correction lens 113 are shown in this order in the drawing, the arrangement of the lens elements is not limited to this order. Moreover, one lens may have a plurality of functions.

The imaging element 130 photoelectrically converts an optical image that is the subject image. For example, a CMOS sensor is used as the imaging element 130. A subject signal photoelectrically converted by the imaging element 130 is converted into a digital signal through an Analog Front End (AFE) 132 and sent to a bus line 131. A memory 133 includes, for example, a work memory, which is a volatile memory such as an SRAM, and a system memory which is a non-volatile recording medium such as an SSD. The work memory passes the subject signal received from the AFE 132 to an image processing unit 134 as an image signal in units of frames or provides a temporary storage area at an intermediate stage during image processing by the image processing unit 134. The system memory holds constants, variables, setting values, control programs, etc. necessary for the operation of the imaging apparatus 100.

The image processing unit 134 converts image data into an image file of a specific image format in accordance with a set imaging mode or in response to an instruction from a user. For example, in order to generate an MPEG file as a moving image, intra-frame coding and inter-frame coding are performed on frame images, which are continuous still images, to thereby perform compression processing. Further, the image processing unit 134 generates a video signal to be displayed on a monitor 136, which is for example a liquid crystal display, in parallel with converting it into an image file, or independently without converting it into an image file. The display processing unit 135 converts the received video signal into a display signal to be displayed on the monitor 136.

The moving image file processed by the image processing unit 134 is recorded on a recording medium 201 via an output processing unit 137 and a recording medium interface 138. The recording medium 201 is a non-volatile memory (e.g., a flash memory or the like) which can be attached to and removed from the imaging apparatus 100. The output processing unit 137 can also transmit the moving image file to an external device via a communication IF 139. The communication IF 139 is, for example, a wireless LAN unit for connecting to the Internet.

The imaging apparatus 100 includes a plurality of operation members 140 that receive an operation from the user. The control unit 150 detects an operation on these operation members 140 and executes processing in accordance with the operation. The control unit 150 is, for example, a CPU (Central Processing Unit), and directly or indirectly controls elements constituting the imaging apparatus 100. The control by the control unit 150 is achieved by a control program or the like read from the memory 133. The control unit 150 also serves a function operation unit that executes each of the subdivided processes. Specific processing as the function operation unit will be described later.

A correction lens drive unit 161 includes a voice coil motor that moves the correction lens 113. The control unit 150 transmits, to the correction lens drive unit 161, a drive signal for moving the correction lens 113 to a target position so as to cancel blur detected by a blur detection sensor. A focus drive unit 162 includes a motor that moves the focus lens 112 in the optical axis direction. The focus drive unit 162 receives an AF control signal generated by the control unit 150 based on contrast information of the image signals acquired continuously, and moves the focus lens 112 (details thereof will be described later). A zoom drive unit 163 includes a motor that moves the zoom lens 111 in the optical axis direction. The zoom drive unit 163 receives a zoom control signal generated by the control unit 150 based on an instruction from the user and moves the zoom lens 111.

Here, an imaging control apparatus that controls autofocus by determining whether the focus is front focus or back focus is for each pixel of the image, which is a feature of this embodiment, will be described.

Figure 2:
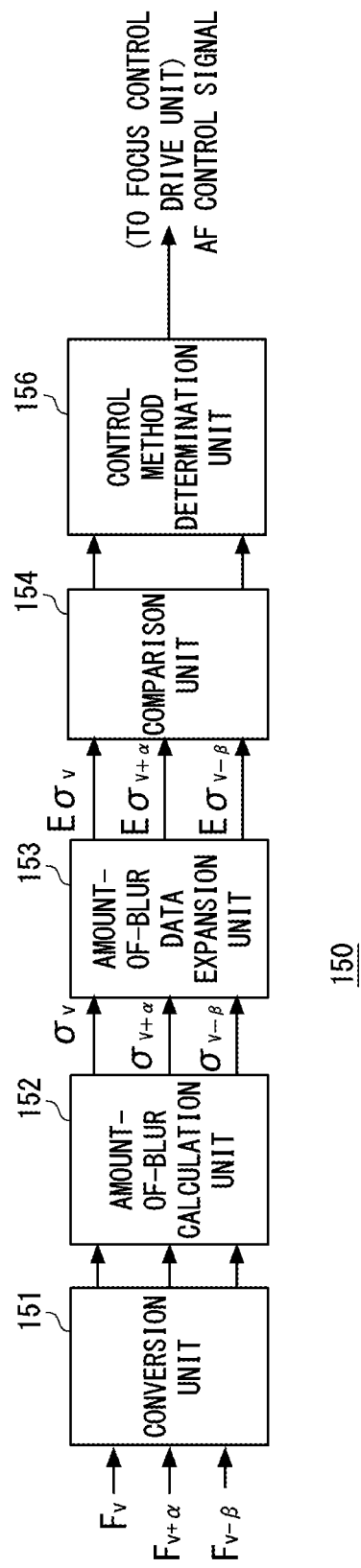
FIG. 2 is a functional block diagram of a control unit according to the first embodiment.
Figure 3:
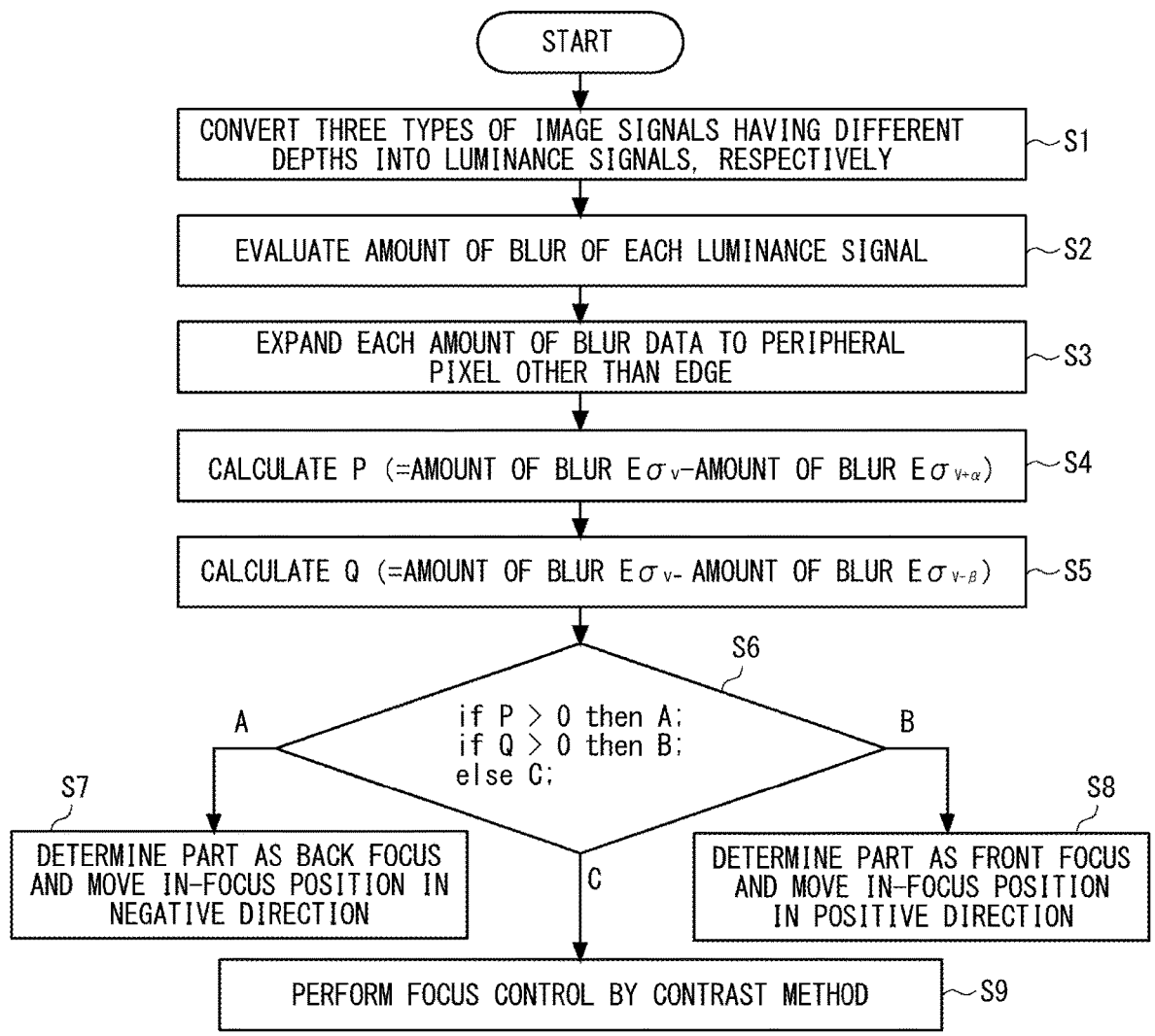
FIG. 3 is a flowchart of AF control according to the first embodiment.

FIG. 2 is a functional block diagram schematically showing the inside of the control unit 150 shown in FIG. 1 as a function operation unit for each process. FIG. 3 is a flowchart of the AF control. The control unit 150 includes, in regard to the AF control, a conversion unit 151, an amount-of-blur calculation unit 152, an amount-of-blur data expansion unit 153, a comparison unit 154, and a control method determination unit 156.

As shown in FIG. 2, the control unit 150 takes in three types of image signals $F_v$, $F_{v+\alpha}$, $F_{v-\beta}$ of different depths V, V+α, and V−β, respectively, from the image processing unit 134 (FIG. 1).

In this embodiment, an image signal F is an RGB signal represented by the three primary colors of an R (red) component, a G (green) component, and a B (blue) component, but it is not limited to this in particular. Alternatively, the image signal F may be an HSV signal or a YUV signal or may be a black and white image signal.

Figure 4:
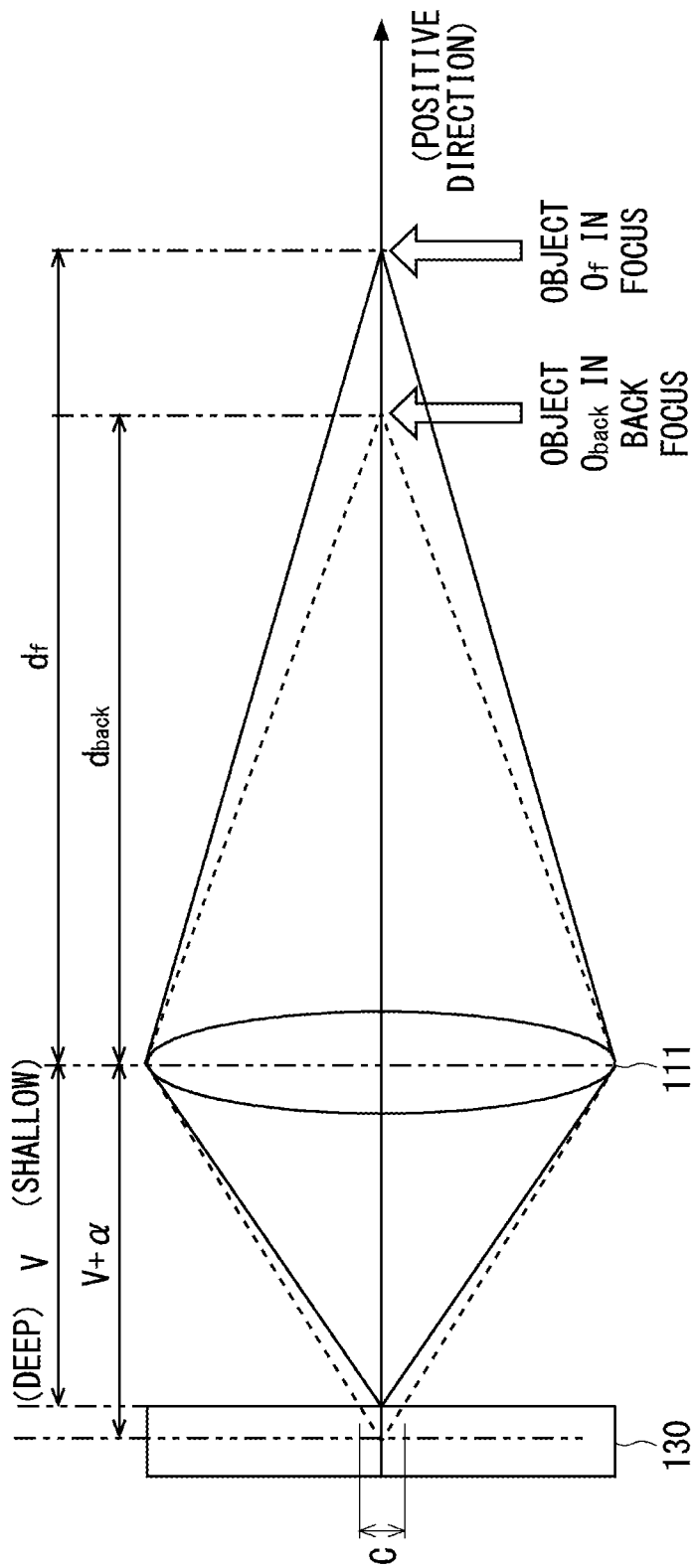
FIG. 4 is a diagram for illustrating a positional relationship between a depth and an object.
Figure 5:
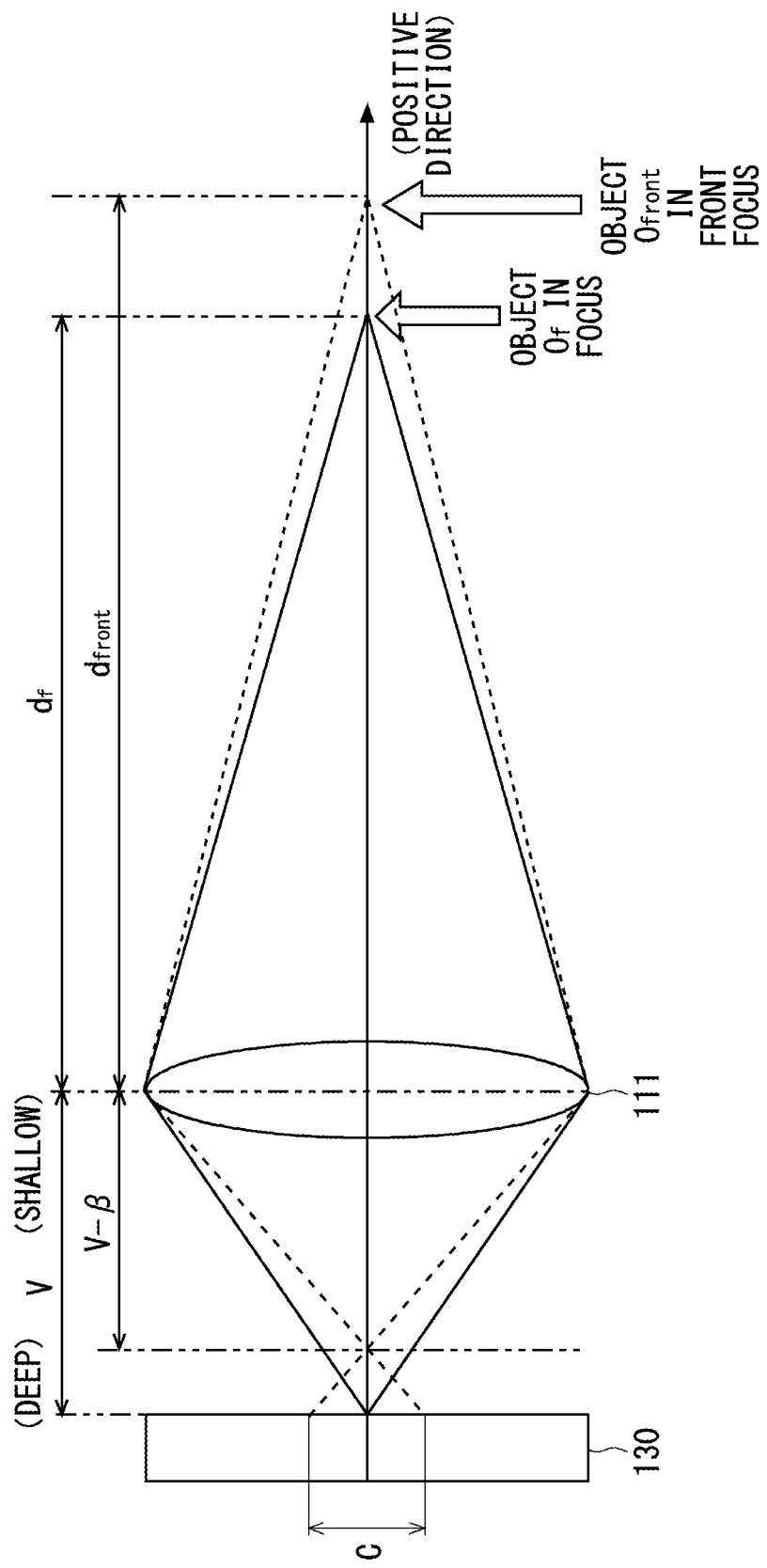
FIG. 5 is a diagram for illustrating the positional relationship between the depth and the object.

Here, a positional relationship between a depth and an object will be described with reference to FIGS. 4 and 5. FIG. 4 is a schematic diagram for illustrating a positional relationship between a first depth (V in this example) at which a first image signal is acquired and a second depth (V+α in this example), which is deeper than the first depth, at which a second image signal is acquired. FIG. 5 is a schematic diagram for illustrating the positional relationship between the first depth (V in this example) at which the first image signal is acquired and a third depth (V−β in this example), which is shallower than the first depth, at which a third image signal is acquired.

In FIG. 4, when an object $O_f$ is present at a position distant by $d_f$ from the lens 111, a light beam group from the object passes through the lens 111 and then is condensed on the imaging element 130 at the depth V. On the other hand, when an object $O_{back}$ is present at a position distant by $d_{back}$ from the lens 111 (a position closer to the lens 111 than the position of the in-focus object $O_f$ is), light from the object in back focus is condensed at the second depth V+α that is deeper than the first depth V. That is, light from the object $O_{back}$ is condensed at a plurality of points on a surface of the imaging element 130, thereby creating the blurred image.

Further, in FIG. 5, when an object is present at a position distant by $d_{front}$ from the lens 111 (a position farther from the lens 111 than the in-focus object is), light from the object in front focus is condensed at the third depth V−β that is shallower than the first depth V. Also in this case, light from the object is condensed at a plurality of points on the surface of the imaging element 130, thereby creating the blurred image. Note that c shown in FIGS. 4 and 5 may be referred to as "diameter of CoC".

The image processing unit 134 acquires videos at the depth V+α and depth V−β substantially at the same time as the video at the depth V. Here, α and β are values that allow visual detection of a change in the depth of focus, and they differ depending on an aperture and a focal length and are determined each time. Further, α and β do not have to be the same and may instead be values close to each other (e.g., $\alpha/\beta < 1/2$ or $\alpha/\beta < 1/3$).

As described above, the acquired three images are taken into the control unit 150 as the image signals $F_v$, $F_{v+\alpha}$, and $F_{v-\beta}$, respectively.

The image signals $F_v$, $F_{v+\alpha}$, and $F_{v-\beta}$ are input to the conversion unit 151 (RGB to Y conversion unit in this example) and converted into luminance signals, respectively (Step S1 in FIG. 3). This conversion is performed by a matrix operation based on a signal standard. Alternatively, a G signal may be used as a substitute.

Next, a method of calculating the amount of blur (Step S2 in FIG. 3) performed by the amount-of-blur calculation unit 152 will be described.

In this embodiment, a known method described in Shaojie Zhuo and Terence Sim, "Defocus map estimation from a single image", Pattern Recognition, Volume 44, Issue 9, September 2011, pp. 1852-1858 is employed as the method of calculating the amount of blur. Hereinafter, an outline of the method of calculating the amount of blur described by Zhuo and Sim (2011) will be described.

An ideal step edge can be modeled as follows.

[Formula 1]

$$f(x) = Au(x) + B,$$ (Formula 1)

In this formula, u(x) is a step function, A is an amplitude of an edge, and B is an offset distance from the edge.

When an object is placed at a focal length $d_f$, all light beams from the object converge to one sensor point, and an image looks sharp. In contrast, light beams from another object at a distance d reaches a plurality of sensor points, and an image looks blurred (see FIG. 4).

The diameter of CoC described above with reference to FIGS. 4 and 5 can be given by the following Formula.

[Formula 2]

$$c = \frac{|d - d_f|}{d} \frac{f_0^2}{N(d_f - f_0)},$$ (Formula 2)

Here, $f_0$ is a focal length, N is a stop number of a camera, and c is a monotonically increasing function of the distance d of the object.

An ideal step edge may be an edge i(x) in the image which is blurred by a Gaussian function (standard deviation σ) representing blurring of defocus.

[Formula 3]

$$i(x) = f(x) \otimes g(x, \sigma).$$ (Formula 3)

Further, when a re-blurred image is generated by further blurring the image again with a Gaussian function (standard deviation $\sigma_o$), an absolute value R of a gradient ratio of the edge of the original image to the edge of the re-blurred image can be given by the following formula (4).

[Formula 4]

$$R = \frac{|\nabla i(0)|}{|\nabla i_1(0)|} = \sqrt{\frac{\sigma^2 + \sigma_0^2}{\sigma^2}}.$$ (Formula 4)

A gradient of the edge depends on both the edge amplitude A and the amount of blur σ. However, the influence of the edge amplitude A is eliminated in the absolute value R of the gradient ratio, and the absolute value R of the gradient ratio depends only on the amounts of blur σ and $\sigma_0$. Therefore, given the maximum value R at the edge position, an unknown amount of blur σ can be calculated by the following formula.

[Formula 5]

$$\sigma = \frac{1}{\sqrt{R^2 - 1}} \sigma_0.$$ (Formula 5)

As described above, the amount of blur can be calculated by obtaining the absolute value R of the gradient ratio of the edge of the original image to the edge of the re-blurred image.

The process of calculating the amount of blur will be described in detail in order with reference to FIGS. 6 and 7.

Figure 6:
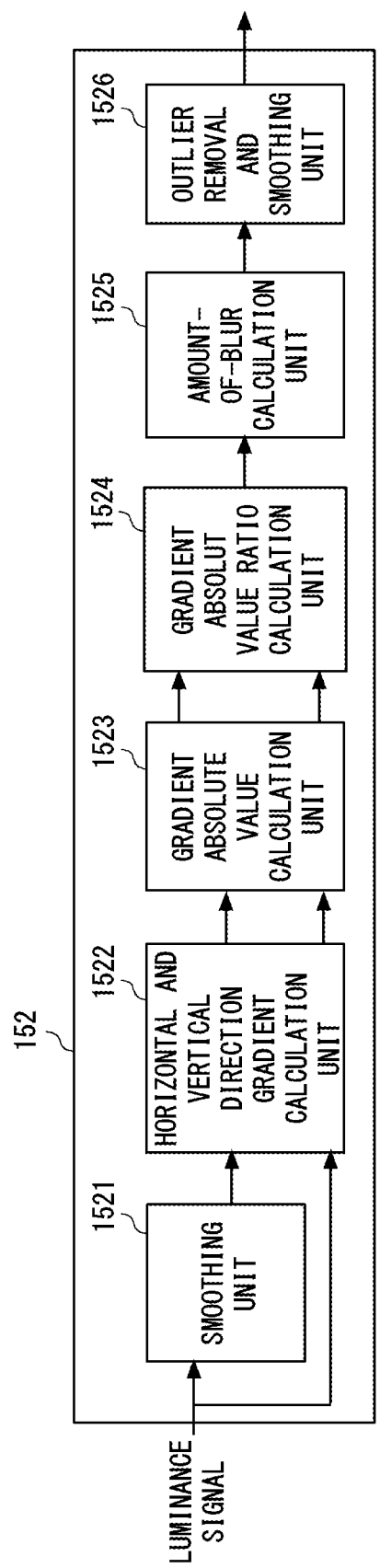
FIG. 6 is a detailed functional block diagram of an amount-of-blur calculation unit.

FIG. 6 is a detailed functional block diagram of the inside of the amount-of-blur calculation unit 152 shown in FIG. 2.

Figure 7:
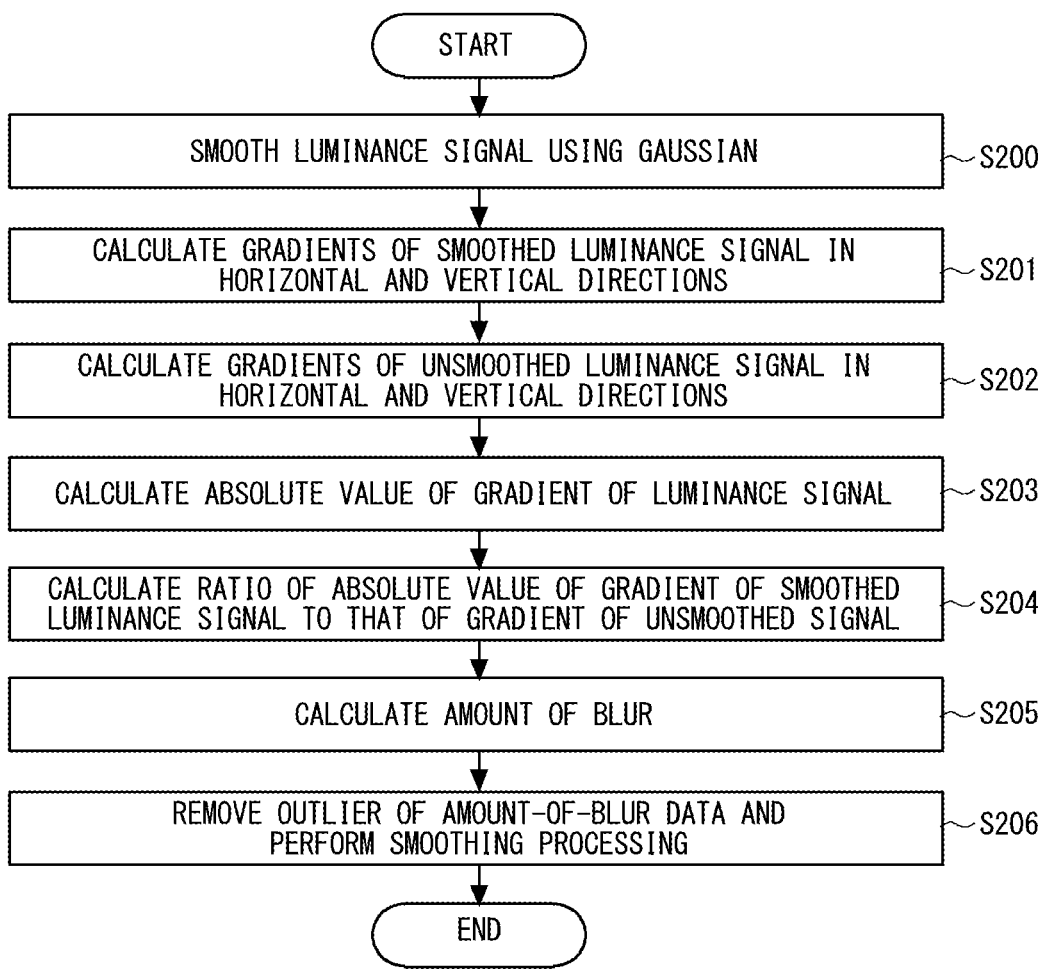
FIG. 7 is a detailed flowchart of amount-of-blur calculation processing.

FIG. 7 is a processing flowchart of the calculation of the amount of blur performed by the amount-of-blur calculation unit 152 shown in FIG. 2.

As shown in FIG. 6, the input luminance signal is smoothed by a smoothing unit 1521 using a low pass filter such as a Gaussian filter (Step S200 in FIG. 7). Here, a known operator used for the Gaussian filter shown in FIG. 8 is used. See R. Fisher, et al., "Gaussian Smoothing", [online], 2003, accessed on Nov. 7, 2018, available at (https://homepages.inf.ed.ac.uk/rbf/HIPR2/gsmooth.htm) for the details of the Gaussian filter.

For the smoothed (re-blurred) luminance signal, a horizontal and vertical direction gradient calculation unit 1522 calculates gradients in the horizontal and vertical directions at the edges (Step S201). Likewise, for an unsmoothed (pre-smoothed) luminance signal, the horizontal and vertical direction gradient calculation unit 1522 also calculates gradients in the horizontal and vertical directions at the edges (Step S202). Here, an operator such as the Sobel convolution kernel of FIG. 9 can be used. See R. Fisher, et al., "Sobel Edge Detector", [online], 2003, accessed on Nov. 7, 2018, available at (https://homepages.inf.ed.ac.uk/rbf/HIPR2/sobel.htm) for the details of the Sobel convolution kernel.

A gradient absolute value calculation unit 1523 calculates the absolute value of the gradient at the edge by obtaining a square root of a sum of squares of the gradient before and after the smoothing (Step S203).

A gradient absolute value ratio calculation unit 1524 calculates the ratio R of the absolute value of the gradient before the smoothing to the absolute value of the gradient after the smoothing (Step S204).

An amount-of-blur calculation unit 1525 calculates the amount of blur at the edge by substituting the ratio R of the absolute value of the gradient into the above Formula 5 (Step S205). Lastly, an outlier removal and smoothing unit 1526 removes an outlier and smooths the calculated amount of blur (Step S206). The data thus obtained is used for the subsequent processing.

Here, referring back to FIGS. 2 and 3, the processing flow of the AF control will be described. The amount-of-blur data expansion unit 153 shown in FIG. 2 expands the amount-of-blur data to a pixel (peripheral edge pixel) for which no amount-of-blur data in the vicinity of the edge is obtained (Step S3). This is to prevent a situation in which there is no pixel corresponding to a specific pixel at the time of comparing sizes of data for determining whether the focus is back focus or front focus (as described later in detail). The amount-of-blur data obtained by the above method is obtained only for the periphery of the edge. Thus, an edge inside a certain image may not completely match an edge inside another image to be compared depending on a difference in a depth of focus setting, deformation, and a subtle change in the size. For example, in the comparison between a plurality of images (two images), there may be a case in which an edge present in one of the images is not present (blurred) in another image, an edge present in one of the images may be deformed, or a position of an edge in one of the images may be different from that of another image. In such a case, it is possible to considerably prevent missing data in a corresponding pixel by expanding data. For the data expansion, for example, data in a pixel at which a Euclidean distance L given by Formula (6) becomes minimum is used.

[Formula 6]

$$L=(r_c-r)^2+(g_c-g)^2+(b_c-b)^2+n\{(I_c-I)^2+(J_c-J)^2\}$$ (Formula 6)

Here, r, g, b are RGB values in the pixel (I, J) without amount-of-blur data of a texture image, and $r_c$, $g_c$, $b_c$ are RGB values in the pixel ($I_c$, $J_c$) with a known amount-of-blur data. Further, n is an appropriate constant such as 1. Such data expansion makes it possible to divert data from pixels having close colors to each other and whose positions are close to each other. The respective expanded amount-of-blur data pieces are referred to as "expanded amount-of-blur data $E\sigma_v$", "expanded amount-of-blur data ($E\sigma_{v+\alpha}$)", and "expanded amount-of-blur data $E\sigma_{v-\beta}$".

Figure 10:
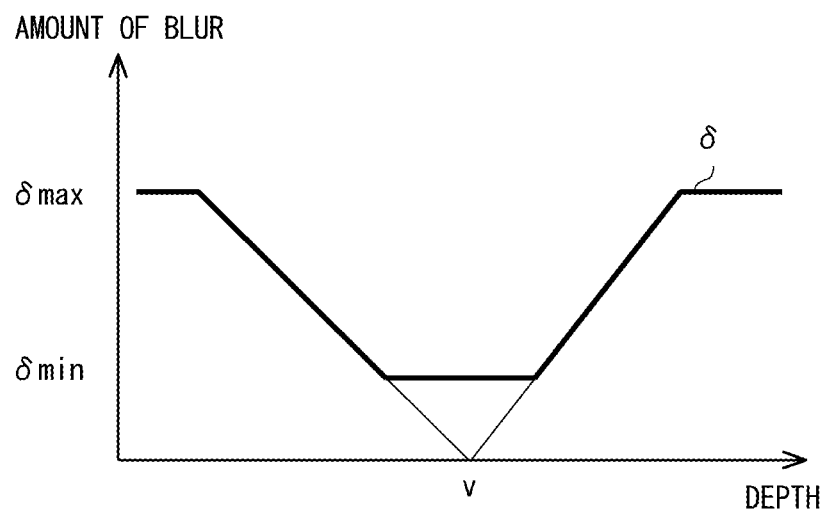
FIG. 10 is a line graph of an amount of blur with respect to the depth.

A method of determining the AF control by comparing the sizes of the amount-of-blur data having different depths of focus will be described with reference to FIGS. 10 to 14. FIG. 10 shows a relationship between the depth of focus and the amount of blur. As shown in FIG. 10, when the depth is at an in-focus position V, the amount of blur is 0. The amount of blur linearly drops and increases sharply before and after the in-focus position V. In this example, since the range of R is consequently limited, the range of derived σ is also limited. Thus, the amount of blur σ indicates the characteristics of a line in the range from $\sigma_{min}$ to $\sigma_{max}$. This line graph is referred to as a reference graph. In this example, a lower limit of R is about 1.1 and an upper limit of R is about 8.0. The lower limit of R is a value obtained from the most gradual edge that can be measured. The upper limit of R is a value obtained from a realistic and strong edge in a natural image. When the lower and upper limits of R are substituted into the above Formula (1), 0.126<σ<2.18 is obtained.

Figure 11:
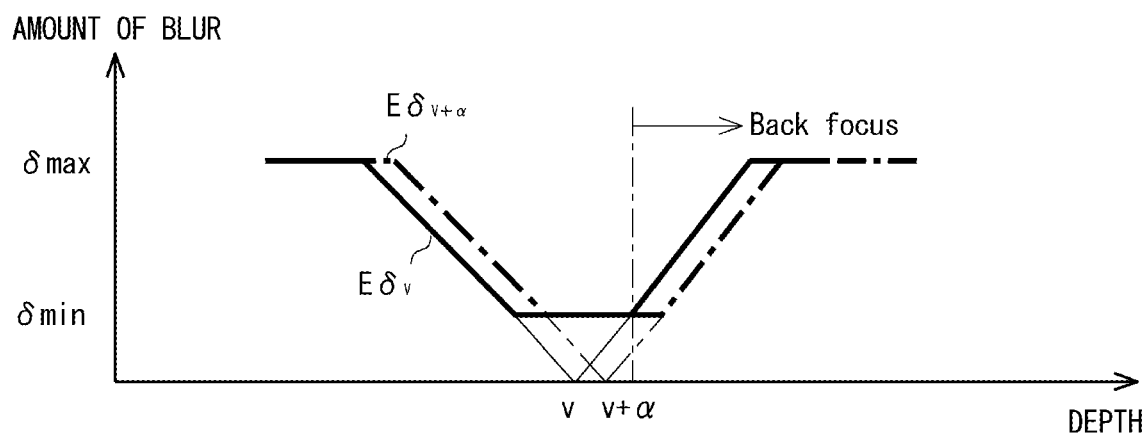
FIG. 11 is a diagram in which a reference graph is compared with a graph shifted by $\alpha$ in a positive direction.

The expanded amount-of-blur data $E\sigma_v$ and the expanded amount-of-blur data $E\sigma_{v+\alpha}$ corresponding to a specific pixel are calculated from the above expansion of the amount-of-blur data, and the comparison unit 154 (FIG. 2) compares the expanded amount-of-blur data $E\sigma_v$ with the expanded amount-of-blur data $E\sigma_{v+\alpha}$ (Step S4 in FIG. 3). Specifically, the comparison unit 154 calculates a difference P between the amount of blur $E\sigma_v$ of the luminance signal (V) and the amount of blur $E\sigma_{v+\alpha}$ of the luminance signal (V+α). As shown in FIG. 11, the size of the reference graph $E\sigma_v$ (solid line) is compared with the graph $E\sigma_{v+\alpha}$ (dotted line) shifted by α from the reference graph $E\sigma_v$ in the positive direction. The shifted graph shows that the light from the object $O_{back}$ is condensed at the second depth V+α (see FIG. 4), and the object $O_f$ which is in focus (i.e., with reduced amount of blur) is positioned closer to the back side than the object $O_{back}$ is (object $O_f$ is positioned farther from the lens than the object $O_{back}$ is). Thus, in the shifted graph, a part where the amount of blur is lower than that in the unshifted graph can be regarded as a back focus area (Step S6). As described above, the control method determination unit 156 transmits an AF control signal to the focus drive unit 162 so as to move the in-focus position in the negative direction (adjust the in-focus position to be in back focus) (Step S7).

Figure 12:
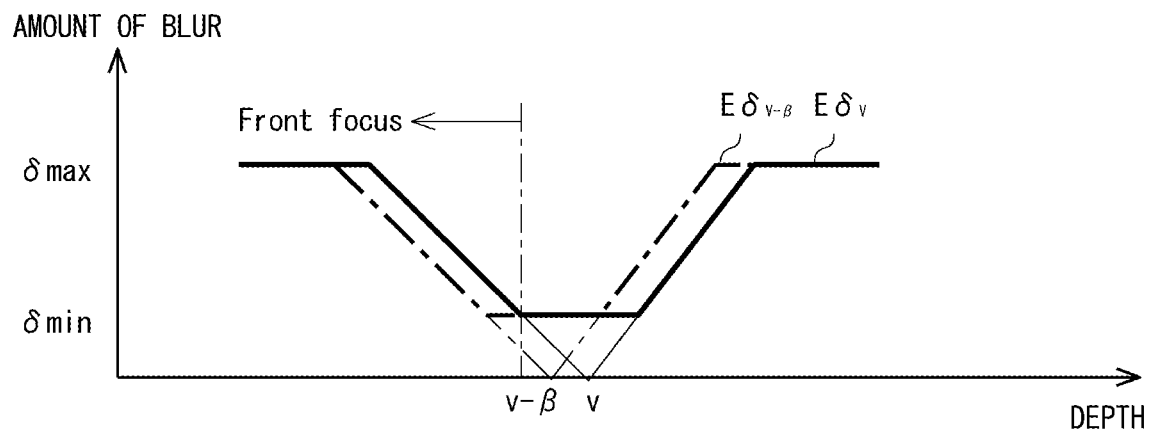
FIG. 12 is a diagram in which a reference graph is compared a graph shifted by $\beta$ in a negative direction.

On the other hand, the expanded amount-of-blur data $E\sigma_v$, and the expanded amount-of-blur data $E\sigma_{v-\beta}$ corresponding to a specific pixel are calculated from the above expansion of the amount-of-blur data, and the comparison unit 154 (FIG. 2) compares the expanded amount-of-blur data (V) with the expanded amount-of-blur data (V−β) (Step S5 in FIG. 3). Specifically, the comparison unit 154 calculates a difference Q between the amount of blur $E\sigma_v$ of the luminance signal (V) and the amount of blur $E\sigma_{v-\beta}$ of the luminance signal (V−β). As shown in FIG. 12, the size of the reference graph $E\sigma_v$ (solid line) is compared with that of the graph (dotted line) shifted by β from the reference graph $E\sigma_v$ in the negative direction. The shifted graph shows that light from the object $O_{front}$ is condensed at the third depth V−β (see FIG. 5), and the object $O_f$ which is in focus (i.e., with reduced amount of blur) is positioned closer to the front side than the object $O_{front}$ is (object $O_f$ is positioned closer to the lens than the object $O_{front}$ is). Thus, in the shifted graph, a part where the amount of blur is lower than that in the unshifted graph can be regarded as a front focus area (Step S6). As described above, the control method determination unit 156 transmits an AF control signal to the focus drive unit 162 so as to move the in-focus position in the positive direction (to adjust the in-focus position to be in front focus) (Step S8).

Figure 13:
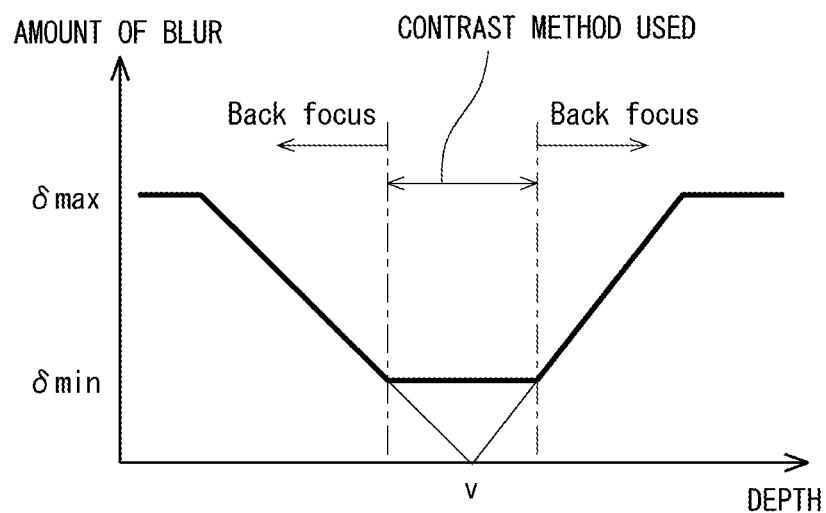
FIG. 13 is a diagram showing a front focus area, an area according to a contrast method, and a back focus area in a line graph of amounts of blur.

The control method determination unit 156 can identify the front focus area and the back focus area of the imaging data at the focal depth V by the comparison performed by the comparison unit 154. Further, the control method determination unit 156 determines that the area which is neither the front focus area nor the back focus area is an area for which the contrast method is used by the above-described expansion of the amount-of-blur data (Step S9 in FIG. 3). FIG. 13 is a diagram showing the front focus area, the area according to the contrast method, and the back focus area in a line graph of the amount of blur.

As discussed so far, the imaging control apparatus according to this embodiment can evaluate the amount of blur at three types of depths based on the DFD method without creating an all-in-focus image and compares the sizes of the amount of blurs to thereby quickly narrow down an in-focus range by determining whether the focus is front focus or back focus. Further, after the in-focus range is narrowed down, the focus control is performed by a method according to related art such as the contrast method, thereby reducing the total calculation cost.

Furthermore, the imaging control apparatus according to this embodiment can shift the depth of focus of the part determined as being the front focus in the positive direction and makes a reevaluation, and shift the depth of focus of the part determined as being the back focus in the negative direction and makes a reevaluation. Furthermore, only a search for a relatively narrow range is required for the area for which the contrast method is used, thereby shortening the total time for controlling the focus.

Second Embodiment

Here, a feature of this embodiment, which is an imaging control apparatus that controls autofocus by determining whether each pixel of an image is in front focus or back focus will be described.

Figure 14:
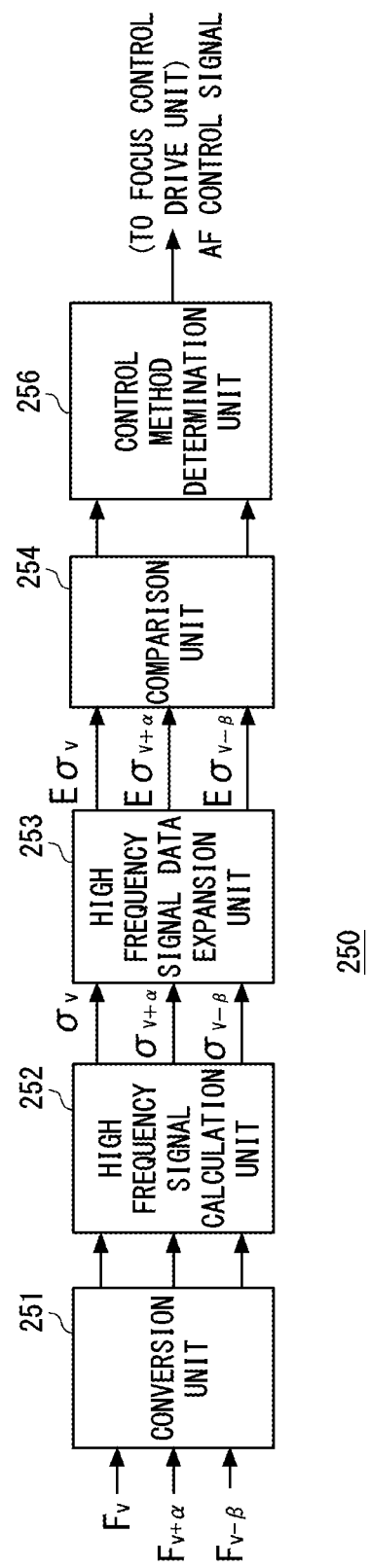
FIG. 14 is a functional block diagram of a control unit according to a second embodiment.
Figure 15:
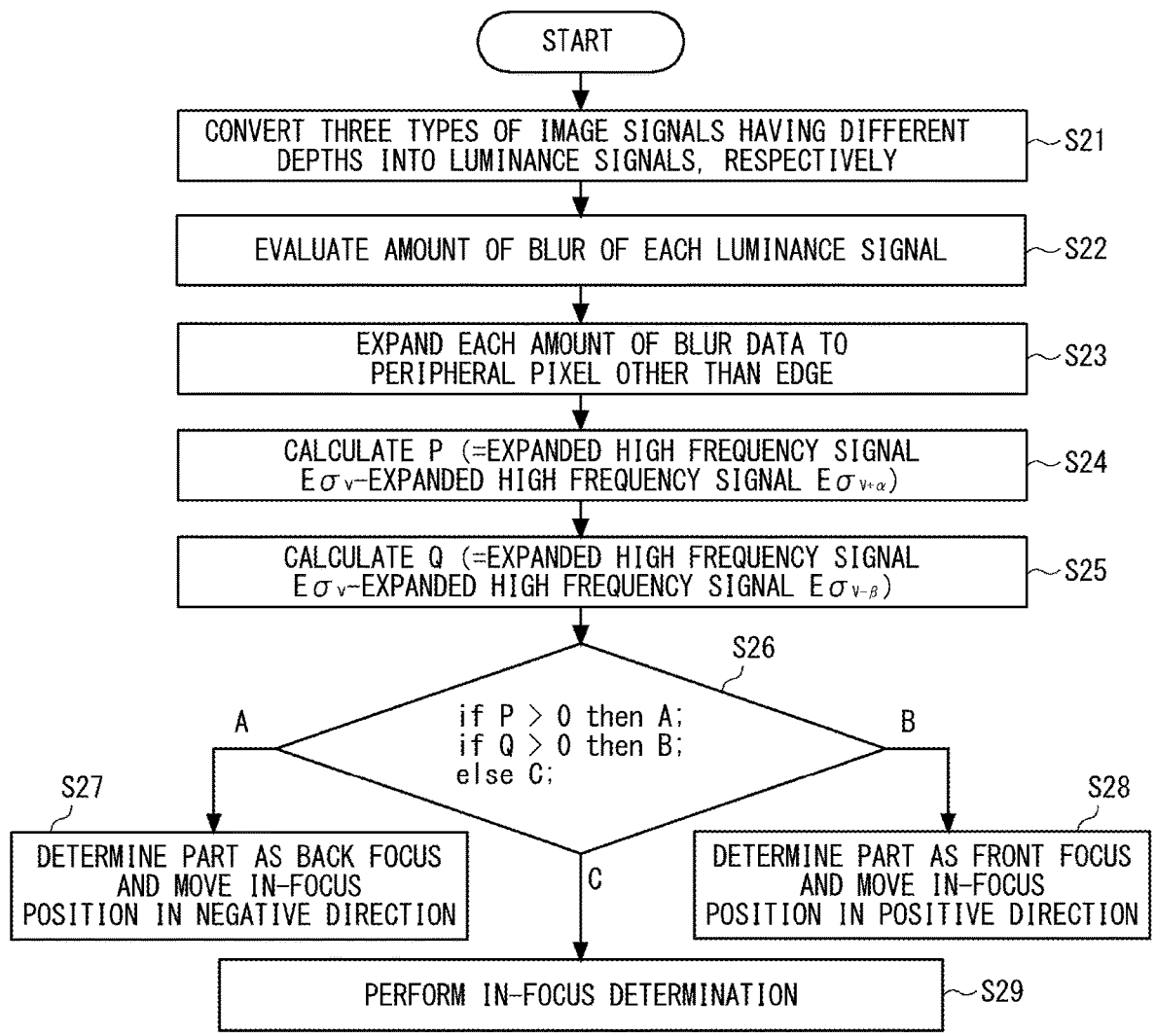
FIG. 15 is a flowchart of AF control according to the second embodiment.

FIG. 14 is a functional block diagram schematically showing the inside of the control unit 250 shown in FIG. 1 as a function operation unit for each process. FIG. 15 is a flowchart of AF control according to a second embodiment. The control unit 250 includes, in regard to the AF control, a conversion unit 251, a high frequency signal calculation unit 252, a high frequency signal data expansion unit 253, a comparison unit 254, and a control method determination unit 256.

As shown in FIG. 14, the control unit 150 takes in three types of image signals $F_v$, $F_{v+\alpha}$, and $F_{v-\beta}$ of different depths V, V+α, and V−β, respectively, from the image processing unit 134 (FIG. 1).

In this embodiment, the image signal F is an RGB signal represented by the three primary colors of an R (red) component, a G (green) component, and a B (blue) component, but it is not limited to this in particular. Alternatively, the image signal F may be an HSV signal or a YUV signal or may be a black and white image signal.

Figure 16:
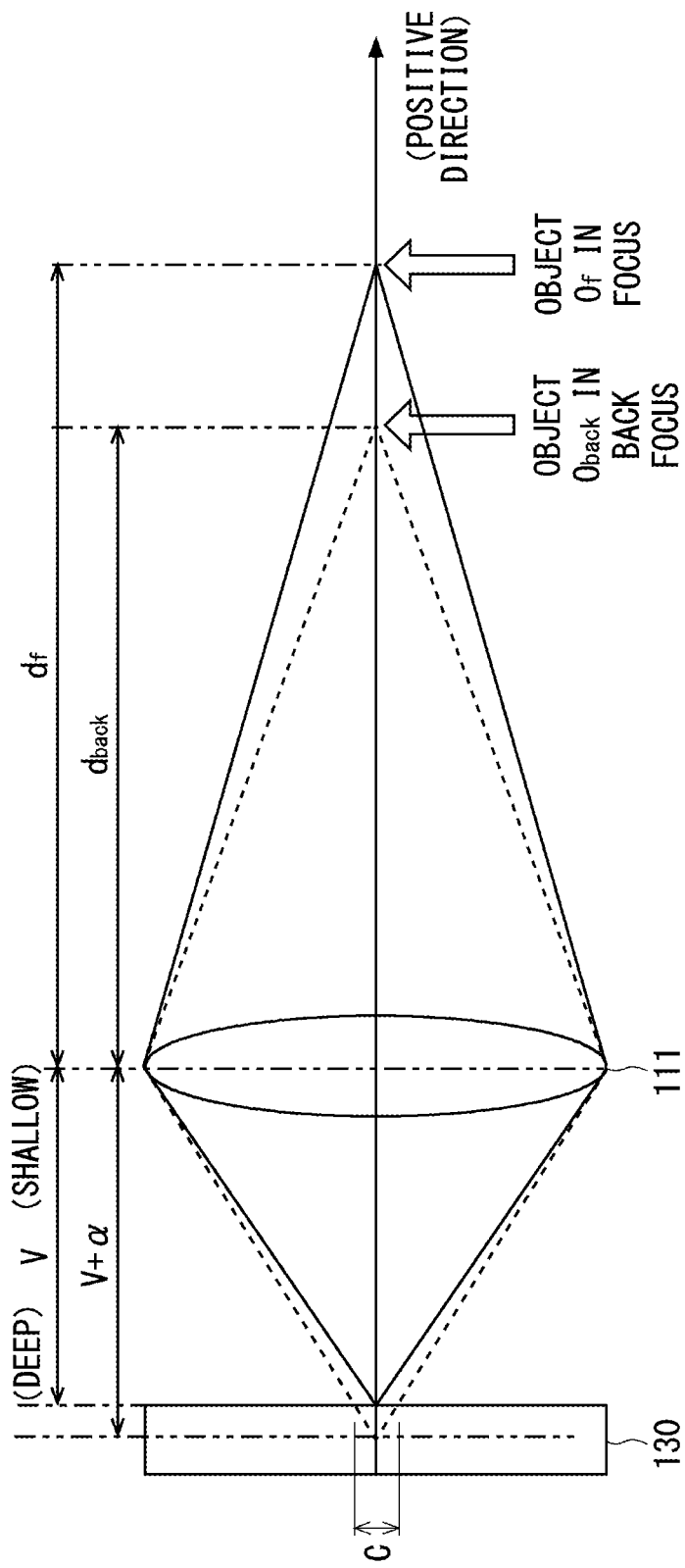
FIG. 16 is a diagram for illustrating a positional relationship between a depth and an object.
Figure 17:
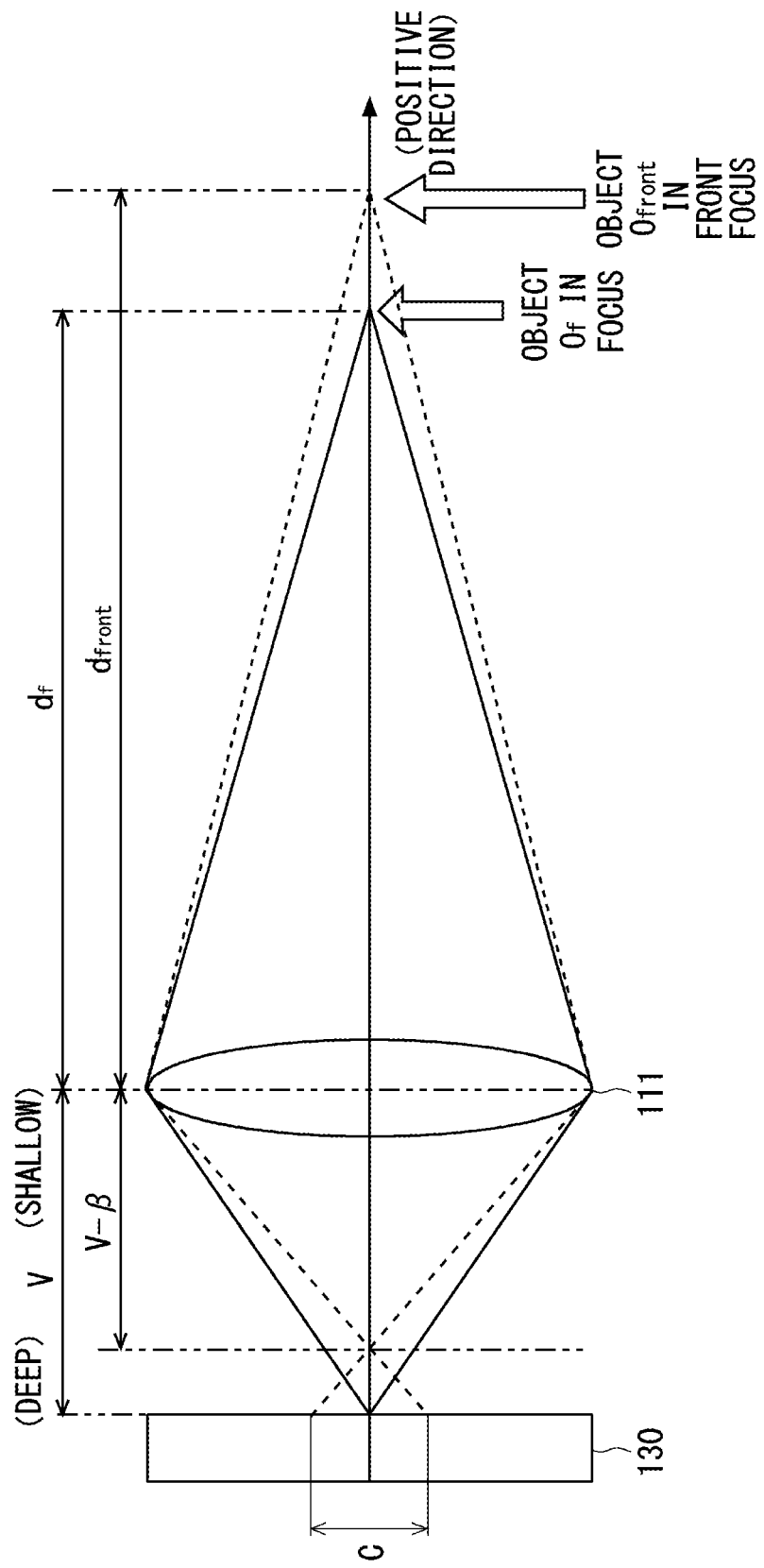
FIG. 17 is a diagram for illustrating a positional relationship between the depth and the object.

Here, a positional relationship between the depth and the object will be described with reference to FIGS. 16 and 17. FIG. 16 is a schematic diagram for illustrating a positional relationship between a first depth (V in this example) at which a first image signal is acquired and a second depth (V+α in this example), which is deeper than the first depth, at which a second image signal is acquired. FIG. 17 is a schematic diagram for illustrating the positional relationship between the first depth (V in this example) at which the first image signal is acquired and a third depth (V−β in this example), which is shallower than the first depth, at which a third image signal is acquired.

In FIG. 16, when an object $O_f$ is present at a position distant by $d_f$ from the lens 111, a light beam group from the object passes through the lens 111 and then is condensed on the imaging element 130 at the depth V. On the other hand, when an object $O_{back}$ is present at a position distant by $d_{back}$ from the lens 111 (a position closer to the lens 111 than the position of the in-focus object $O_f$ is), light from the object in back focus is condensed at the second depth V+α that is deeper than the first depth V. That is, light from the object $O_{back}$ is condensed at a plurality of points on a surface of the imaging element 130, thereby creating the blurred image.

Further, in FIG. 17, when an object is present at a position distant by $d_{front}$ from the lens 111 (a position farther from the lens 111 than the in-focus object is), light from the object in front focus is condensed at the third depth V−β that is shallower than the first depth V. Also in this case, since light from the object is condensed at a plurality of points on the surface of the imaging element 130, thereby creating the blurred image. Note that c shown in FIGS. 16 and 17 may be referred to as "diameter of CoC".

The image processing unit 134 acquires videos at the depth V+α and depth V−β substantially at the same time as the video at the depth V. Here, α and β are values that allow visual detection of a change in the depth of focus, and they differ depending on an aperture and a focal length and are determined each time. Further, α and β do not have to be the same and may instead be values close to each other (e.g., $\alpha/\beta < 1/2$ or $\alpha/\beta < 1/3$).

As described above, the acquired three images are taken into the control unit 250 as the image signals $F_v$, $F_{v+\alpha}$, and $F_{v-\beta}$, respectively.

The image signals $F_v$, $F_{v+\alpha}$, and $F_{v-\beta}$ are input to the conversion unit 251 (RGB to Y conversion unit in this example) and converted into a first luminance signal, a second luminance signal, and a third luminance signal, respectively (Step S21 in FIG. 15). This conversion is performed by a matrix operation based on a signal standard. Alternatively, a G signal may be used as a substitute.

Next, processing of calculating the high frequency signal (Step S22 of FIG. 15) performed by the high frequency signal calculation unit 252 will be described in detail with reference to FIGS. 18 and 19.

Figure 18:
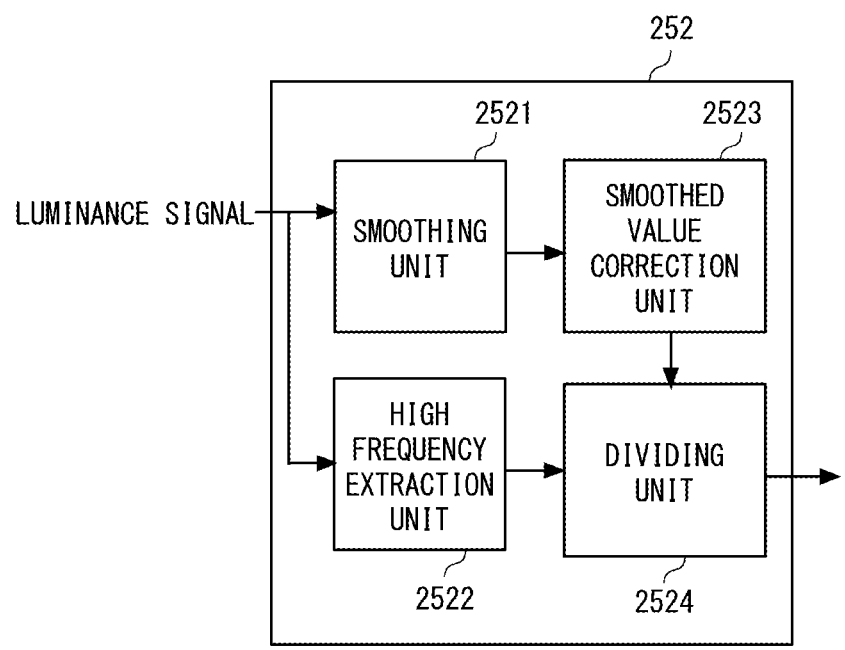
FIG. 18 is a detailed functional block diagram of a high frequency signal calculation unit.

FIG. 18 is a detailed functional block diagram of the inside of the high frequency signal calculation unit 252 shown in FIG. 14. FIG. 19 is a processing flowchart for calculating a high frequency signal performed by the high-frequency signal calculation unit 252 shown in FIG. 14.

Figure 19:
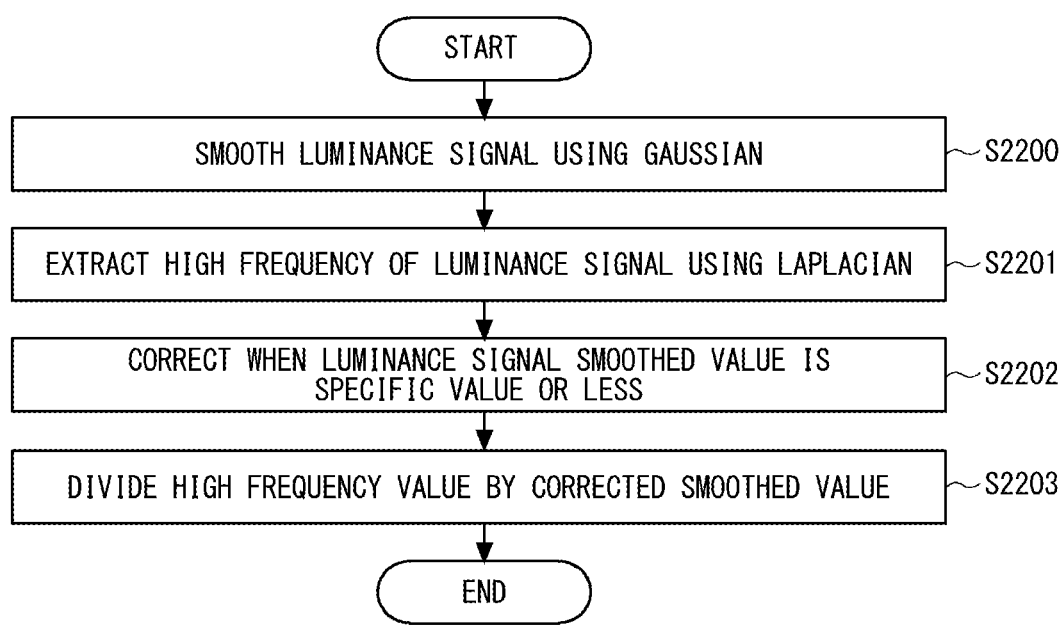
FIG. 19 is a detailed flowchart of high frequency signal calculation processing.

As shown in FIG. 18, the input luminance signal is smoothed by a smoothing unit 2521 using a low pass filter such as a Gaussian filter (Step S2200 in FIG. 19). Here, an operator used for the Gaussian filter shown in FIG. 20 is used.

Specifically, the smoothing unit 2521 generates a first smoothed signal, a second smoothed signal, and a third smoothed signal obtained by smoothing the first luminance signal, the second luminance signal, and the third luminance signal, respectively, using a Gaussian filter.

Further, the high frequency extraction unit 2522 extracts a high frequency of the input luminance signals using a Laplacian filter (Step S2201). The Laplacian filter used here may be used for processing of subtracting the Gaussian from the original image as shown in FIG. 21. As shown in the drawing, for the 5×5 center part, (1−36/256=) 220/256 is given, and for the other parts, the all signs of the operators are reversed (0−x/256=−x/256).

To be more specific, the high frequency extraction unit 2522 generates a first extracted high frequency signal, a second extracted high frequency signal, and a third extracted high level which are obtained by extracting a high frequency of the first luminance signal, the second luminance signal, and the third luminance signal, respectively, using a Laplacian filter.

Figure 22:
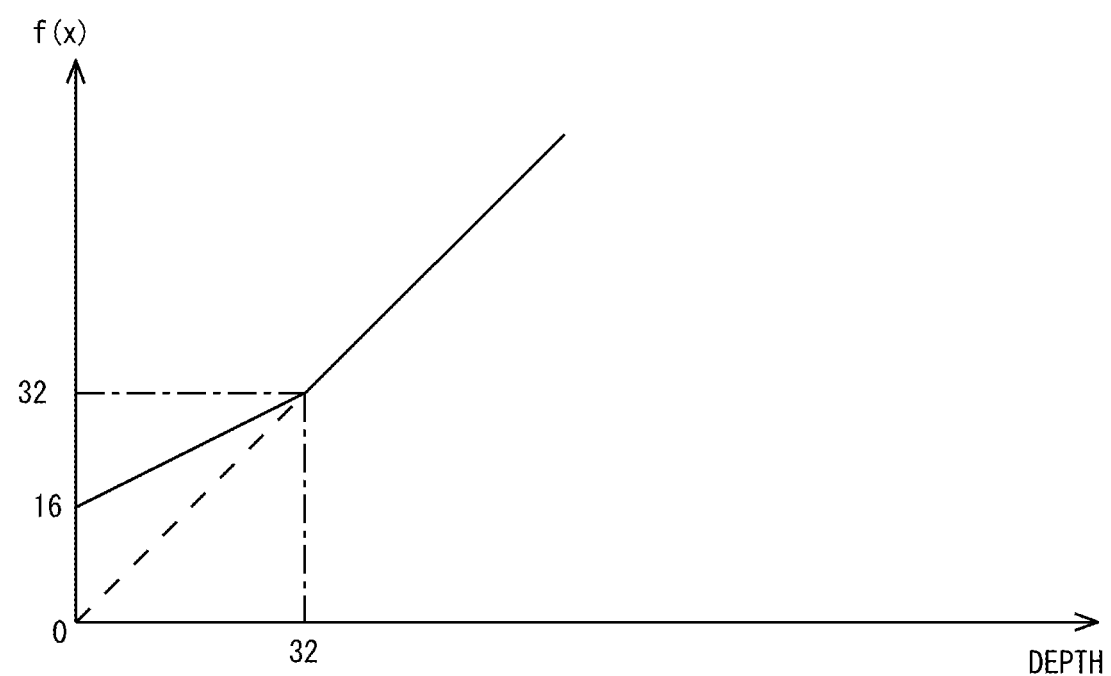
FIG. 22 is a graph for illustrating smoothed value correction processing performed by a smoothed value correction unit.

As for the function f(x) defined by the smoothed value x, a smoothed value correction unit 2523 (FIG. 18) corrects f(x) so as to increase it in such a way that when x is equal to or greater than a specific value, x=f(x) holds, while when x is less than the specific value (i.e., dark part), x<f(x) holds (Step S2202). For example, in the case of an 8-bit system, the following can be used.

if (x<32) f(x)=32+0.5*(x−32);
else f(x)=x;
(See FIG. 22)

To be more specific, assuming that the value of the first smoothed signal is $x_1$, the second smoothed signal is $x_2$, and the third smoothed signal is $x_3$, when each of $x_1$, $x_2$, and $x_3$ is smaller than the specific value, the smoothed value correction unit generates a first corrected smoothed signal corrected to have a value of $x_1 < f_1(x_1)$, a second corrected smoothed signal corrected to have a value of $x_2 < f_2(x_2)$, and a third corrected smoothed signal corrected to have a value of $x_3 < f_3(x_3)$, respectively. The reason for performing such a correction process of the smoothed values will be described later.

A dividing unit 2524 divides an output of the Laplacian from the high frequency extraction unit 2522 by the smoothed value f(x) corrected as described above (Step S2203). This reduces the high frequency signal in a high luminance part, avoids overexposure from occurring, and achieves an image signal in which an in-focus level is correctly reflected. On the other hand, enhancing the high frequency signal at low luminance contributes to focusing in the dark part. An excessive enhancement of the high frequency signal at low luminance could cause noise to occur. The above processing of correcting the smoothed value f(x) is performed to avoid this noise.

Specifically, the dividing unit 2524 divides the first extracted high frequency signal, the second extracted high signal, and the third extracted high frequency signal by the first corrected smoothed signal, the second corrected smoothed signal, and the third corrected smoothed signal, which are corrected by the smoothed value correction unit 2523 to calculate a first high frequency signal $\sigma_v$, a second high frequency signal $\sigma_{v+\alpha}$, and a third high frequency signal $\sigma_{v-\beta}$, respectively.

The above high frequency signal data may be subjected to smoothing processing a plurality of times using a low pass filter such as Gaussian as necessary. The high frequency signal data $\sigma_v$, $\sigma_{v+\alpha}$, and $\sigma_{v-\beta}$ for the images of different depths thus obtained are used in the subsequent processing.

Here, referring back to FIGS. 14 and 15, the processing flow of the AF control in each pixel of the image will be described.

The high frequency signal data expansion unit 253 shown in FIG. 14 expands the high frequency signal to a pixel (peripheral edge pixel) for which no high frequency signal data in the vicinity of the edge is obtained (Step S23). This is to prevent a situation in which there is no pixel corresponding to a specific pixel at the time of comparing sizes of data for determining whether the focus is back focus or front focus. This will be described later in detail. The high frequency signal data obtained by the above method is obtained only for the periphery of the edge. Thus, an edge inside a certain image may not completely match an edge inside another image to be compared depending on a difference in a depth of focus setting, deformation, and a subtle change in the size. For example, in the comparison between a plurality of images (two images), there may be a case in which an edge present in one of the images is not present (blurred) in another image, an edge present in one of the images may be deformed, or a position of an edge in one of the images may be different from that of another image. In such a case, it is possible to considerably prevent missing data in a corresponding pixel by expanding data. For the data expansion, for example, data in a pixel at which a Euclidean distance L given by Formula (7) becomes minimum is used.

[Formula 7]

$$L=(r_c-r)^2+(g_c-g)^2+(b_c-b)^2+n\{(I_c-I)^2+(J_c-J)^2\} \quad \text{(Formula 7)}$$

Here, r, g, b are RGB values in the pixel (I, J) without high frequency signal data of a texture image, and $r_c$, $g_c$, $b_c$ are RGB values in the pixel ($I_c$, $J_c$) with known high frequency signal data. Further, n is an appropriate constant such as 1. Such data expansion makes it possible to divert data from pixels having close colors to each other and whose positions are close to each other. The respective expanded high frequency signal data pieces are referred to as "expanded high frequency signal data $E\sigma_v$", "expanded high frequency signal data ($E\sigma_{v+\alpha}$)", and "expanded high frequency signal data $E\sigma_{v-\beta}$".

Figure 23:
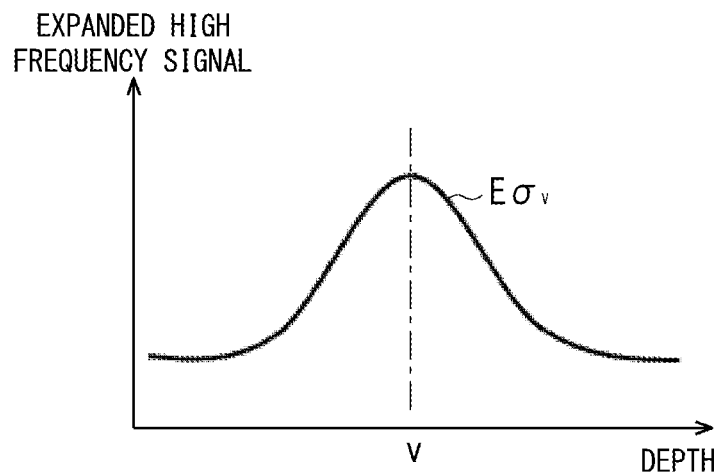
FIG. 23 is a diagram showing a relationship between a depth of focus and a high frequency signal.
Figure 24:
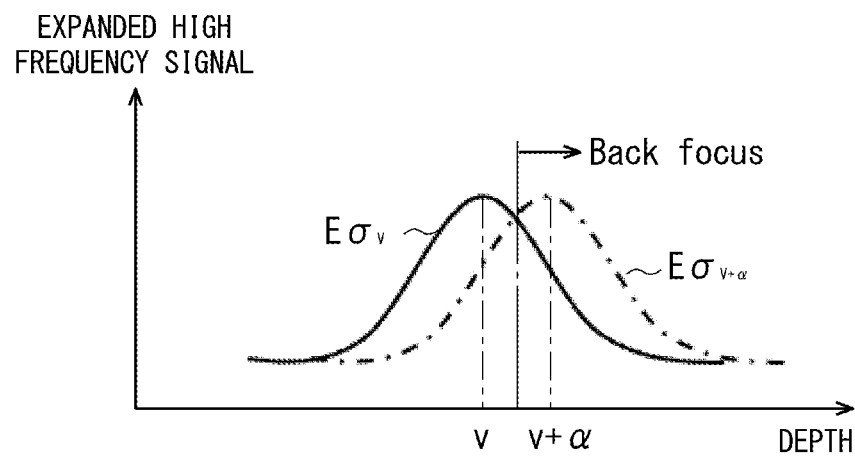
FIG. 24 is a diagram in which a reference graph is compared with a graph shifted by $\alpha$ in a positive direction.
Figure 25:
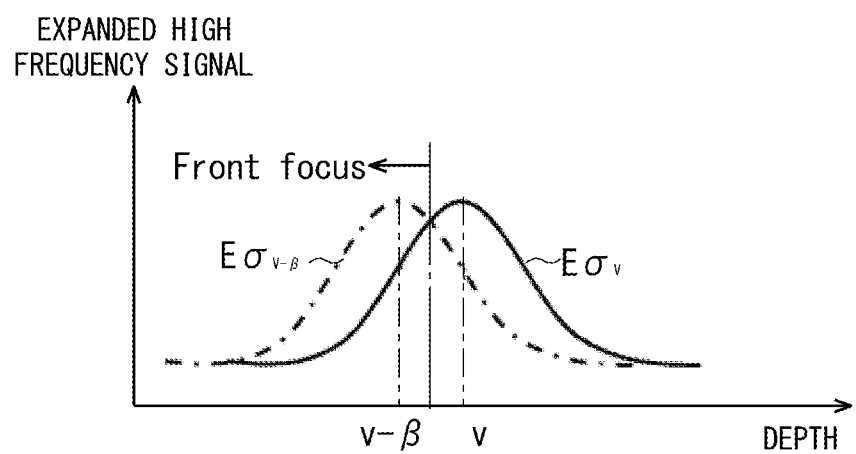
FIG. 25 is a diagram in which a reference graph is compared with a graph shifted by $\beta$ in a negative direction.

A method of determining the AF control by comparing the sizes of three high frequency signal data pieces having different depths of focus will be described with reference to FIGS. 23 to 25. FIG. 23 shows a relationship between the depth of focus and the high frequency signal. As shown in FIG. 23, the graph is a normal distribution such that the high frequency signal reaches its maximum when the depth is at the in-focus position V. This graph may be referred to as a reference graph $E\sigma_v$. The form of the graph may change in various ways depending on the luminance value and the state of the edge. In this example, it is assumed that respective pixels of three images at the same part of the same subject are compared with each other, and thus the graphs having the same form are compared with each other.

The expanded high frequency signal data $E\sigma_v$ and the expanded high frequency signal data $E\sigma_{v+\alpha}$ corresponding to a specific pixel are calculated from the above expansion of the high frequency signal data, and the comparison unit 254 (FIG. 14) compares the expanded high frequency signal data $E\sigma_v$ with the expanded high frequency signal data $E\sigma_{v+\alpha}$ (Step S24 in FIG. 15). Specifically, the comparison unit 254 calculates a difference P between the high frequency signal $E\sigma_v$ of the luminance signal (V) and the high frequency signal $E\sigma_{v+\alpha}$ of the luminance signal (V+α). As shown in FIG. 24, the size of the reference graph $E\sigma_v$ (solid line) is compared with that of the graph $E\sigma_{v+\alpha}$ (dotted line) shifted by α from the reference graph $E\sigma_v$ in the positive direction. The shifted graph shows that light from the object $O_{back}$ is condensed at the second depth V-α (see FIG. 16), and the object $O_f$ which is in focus (i.e., with reduced amount of blur, meaning that the expanded high frequency signal is increased) is positioned closer to the back side than the object $O_{back}$ is (object $O_f$ is positioned farther from the lens than the object $O_{back}$ is). Thus, as shown in FIG. 24, in the shifted graph, a part where the high frequency signal is larger than that in the unshifted graph can be regarded as a back focus area. In other words, in the unshifted graph, a part where the high frequency signal is smaller than that in the shifted graph can be regarded as the back focus area (Step S26). As described above, the control method determination unit 256 transmits an AF control signal to the focus drive unit 162 so as to move the in-focus position in the negative direction (to adjust the in-focus position to be in back focus) (Step S27).

On the other hand, the expanded high frequency signal data $E\sigma_v$ and the expanded high frequency signal data $E\sigma_{v-\beta}$ corresponding to a specific pixel are calculated from the above expansion of the high frequency signal data, and the comparison unit 254 (FIG. 14) compares the expanded high frequency signal data (V) with the expanded high frequency signal data (V-β) (Step S25 in FIG. 15). Specifically, the comparison unit 254 calculates a difference Q between the high frequency signal $E\sigma_v$ of the luminance signal (V) and the high frequency signal data $E\sigma_{v-\beta}$ of the luminance signal (V-β). As shown in FIG. 25, the size of the reference graph $E\sigma_v$ (solid line) is compared with that of the graph (dotted line) shifted by β from the reference graph $E\sigma_v$ in the negative direction. The shifted graph shows that light from the object $O_{front}$ is condensed at the third depth V-β (see FIG. 17), and the object $O_f$ which is in focus (i.e., with reduced amount of blur, meaning that the expanded high frequency signal is increased) is positioned closer to the front side than the object $O_{front}$ is (object $O_f$ is positioned closer to the lens than the object $O_{front}$ is). Thus, as shown in FIG. 25, in the shifted graph, a part where the high frequency signal is larger than that in the unshifted graph can be regarded as a front focus area. In other words, in the unshifted graph, a part where the high frequency signal is smaller than that in the shifted graph can be regarded as the front focus area (Step S26). As described above, the control method determination unit 256 transmits the AF control signal to the focus drive unit 162 so as to move the in-focus position in the positive direction (to adjust the in-focus position to be in front focus) (Step S28).

The control method determination unit 256 can identify the front focus area and the back focus area of imaging data at the focal depth V by the comparison performed by the comparison unit 254. An in-focus determination (a determination about whether the focus is within the in-focus range) can also be performed by a known method (Step S29 in FIG. 15). Furthermore, an adjustment may be made by a method according to related art as necessary.

As discussed so far, the imaging control apparatus according to this embodiment can evaluate the high frequency at three types of depths without creating an all-in-focus image and compares the sizes of the high frequency signals to thereby quickly narrow down the in-focus range by determining whether the focus is front focus or back focus. Further, after the in-focus range is narrowed down, the focus control is performed by a method according to related art such as the contrast method, thereby reducing the total man-hours required for calculation.

Furthermore, the imaging control apparatus according to this embodiment can shift the depth of focus of the part determined as being the front focus in the positive direction and makes a reevaluation, and shift the depth of focus of the part determined as being the back focus in the negative direction and makes a reevaluation.

According to this embodiment, it is possible to provide an imaging control apparatus, an imaging apparatus, and an imaging control program capable of reducing calculation cost required for AF.

The first and second embodiments can be combined as desirable by one of ordinary skill in the art.

Further, respective elements shown in the drawings as functional blocks that perform various processing can be implemented by a CPU, a memory, and other circuits in hardware and may be implemented by programs loaded into the memory in software. Those skilled in the art will therefore understand that these functional blocks may be implemented in various ways by only hardware, only software, or the combination thereof without any limitation.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An imaging control apparatus comprising:
   a conversion unit configured to convert a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;
   a signal calculation unit configured to calculate a first signal, a second signal and a third signal about an amount of blur or high frequency signal, which are related to an edge, based on the first luminance signal, the second luminance signal, and the third luminance signal, respectively;
   a data expansion unit configured to expand the calculated first signal, the calculated second signal, and the calculated third signal respectively to first expanded signal data, second expanded signal data, and third expanded signal data, which are related to a peripheral edge pixel;
   a comparison unit configured to compare the first expanded signal data, the second expanded signal data, and the third expanded signal data with each other; and
   a control method determination unit configured to set a back focus area based on a magnitude relation between the first expanded signal data and the second expanded signal data and set a front focus area based on magnitude relation between the first expanded signal data and the third expanded signal data to thereby control focus.

2. The imaging control apparatus according to claim 1, wherein the signal calculation unit calculates an amount of blur which is related to an edge, and
   the control method determination unit sets an area determined, by the comparison unit, that the first expanded amount-of-blur data is greater than the second expanded amount-of-blur data as a back focus area and sets an area determined, by the comparison unit, that the first expanded amount-of-blur data is greater than the third expanded amount-of-blur data as a front focus area to thereby control focus.

3. The imaging control apparatus according to claim 2, wherein the control method determination unit controls the focus by a contrast method in an area other than the back focus area and the front focus area.

4. The imaging control apparatus according to claim 2, wherein the control method determination unit adjusts a depth in the back focus area in a negative direction and adjusts a depth in the front focus area in a positive direction.

5. The imaging control apparatus according to claim 2, wherein the signal calculation unit calculates the first signal, the second signal, and the third signal, which are related to the edge, based on gradients of the first luminance signal, the second luminance signal, and the third luminance signal and gradients of luminance signals obtained by smoothing the first luminance signal, the second luminance signal, and the third luminance signal using a low pass filter, respectively.

6. The imaging control apparatus according to claim 1, wherein the signal calculation unit calculates a high frequency signal which is related to an edge, and
   the control method determination unit sets an area determined, by the comparison unit, that the first expanded high frequency signal data is greater than the second expanded high frequency signal data as a back focus area and sets an area determined, by the comparison unit, that the first expanded high frequency signal data is greater than the third expanded high frequency signal data as a front focus area to thereby control focus.

7. The imaging control apparatus according to claim 6, wherein the signal calculation unit comprises:
   a smoothing unit configured to generate a first smoothed signal, a second smoothed signal, and a third smoothed signal obtained by smoothing the first luminance signal, the second luminance signal, and the third luminance signal using a Gaussian filter;
   a high frequency extraction unit configured to generate a first extracted high frequency signal, a second extracted high frequency signal, and a third extracted high frequency signal obtained by extracting a high frequency of the first luminance signal, the second luminance signal, and the third luminance signal using a Laplacian filter; and
   a dividing unit configured to divide the first extracted high frequency signal, the second extracted high frequency signal, and the third extracted high frequency signal by the first smoothed signal, the second smoothed signal, the third smoothed signal, respectively, to calculate a first high frequency signal, a second high frequency signal, and a third high frequency signal.

8. The imaging control apparatus according to claim 7, wherein the signal calculation unit further comprises a smoothed value correction unit configured to, assuming that a value of the first smoothed signal is $x_1$, a value of the second smoothed signal is $x_2$, and a value of the third smoothed signal is $x_3$, when each of $x_1$, $x_2$, and $x_3$ is smaller than a specific value, divide the first extracted high frequency signal, the second extracted high frequency signal, and the third extracted high frequency signal by a first corrected smoothed signal corrected to have a value of $x_1 < f_1(x_1)$, a second corrected smoothed signal corrected to have a value of $x_2 < f_2(x_2)$, and a third corrected smoothed signal corrected to have a value of $x_3 < f_3(x_3)$ to calculate a first high frequency signal, a second high frequency signal, and a third high frequency signal, respectively.

9. The imaging control apparatus according to claim 8, wherein the control method determination unit adjusts a depth in the back focus area in a negative direction and adjusts a depth in the front focus area in a positive direction.

10. An imaging apparatus comprising:
an imaging unit; and
the imaging control apparatus according to claim 6.

11. An imaging apparatus comprising:
an imaging unit; and
the imaging control apparatus according to claim 1.

12. A non-transitory computer readable medium storing an imaging control program that causes a computer to execute:

processing of converting a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;

processing of calculating a first signal, a second signal and a third signal about an amount of blur or high frequency signal, which are related to an edge, based on the first luminance signal, the second luminance signal, and the third luminance signal, respectively;

processing of expanding the calculated first signal, the calculated second signal, and the calculated third signal respectively to first expanded signal data, second expanded signal data, and third expanded signal data, which are related to a peripheral edge pixel;

processing of comparing the first expanded signal data, the second expanded signal data, and the third expanded signal data with each other; and processing of setting a back focus area based on a magnitude relation between the first expanded signal data and the second expanded signal data and setting a front focus area based on a magnitude relation between the first expanded signal data and the third expanded signal data to thereby control focus.

13. An imaging control method comprising:

converting a first image signal acquired at a first depth, a second image signal acquired at a second depth that is deeper than the first depth, and a third image signal acquired at a third depth that is shallower than the first depth into a first luminance signal, a second luminance signal, and a third luminance signal, respectively;

calculating a first signal, a second signal and a third signal about an amount of blur or high frequency signal, which are related to an edge, based on the first luminance signal, the second luminance signal, and the third luminance signal, respectively;

expanding the calculated first signal, the calculated second signal, and the calculated third signal respectively to first expanded signal data, second expanded signal data, and third expanded signal data, which are related to a peripheral edge pixel;

comparing the first expanded signal data, the second expanded signal data, and the third expanded signal data with each other; and setting a back focus area based on a magnitude relation between the first expanded signal data and the second expanded signal data and setting a front focus area based on a magnitude relation between the first expanded signal data and the third expanded signal data to thereby control focus.

* * * * *